United States Patent
Ding et al.

(10) Patent No.: US 7,248,394 B2
(45) Date of Patent: Jul. 24, 2007

(54) TRANSFLECTIVE ELECTROPHORETIC DISPLAY AND MANUFACTURING METHOD THEREOF

(75) Inventors: Jau-Min Ding, Taipei (TW); Chi-Chang Liao, Tai Nan (TW); Shie-Chang Jeng, Ping Tung Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 91 days.

(21) Appl. No.: 11/248,270

(22) Filed: Oct. 13, 2005

(65) Prior Publication Data

US 2006/0209010 A1    Sep. 21, 2006

(30) Foreign Application Priority Data

Mar. 15, 2005    (TW) .............................. 94107922 A (51) Int. Cl.
*G02B 26/00* (2006.01)
*G09G 3/34* (2006.01)

(52) U.S. Cl. ...................................... 359/296; 345/107

(58) Field of Classification Search ................ 345/107; 359/296
See application file for complete search history.

(56) References Cited

U.S. PATENT DOCUMENTS

| | | | |
|---|---|---|---|
| 6,621,541 B1* | 9/2003 | Choi | ........................... 349/113 |
| 6,639,580 B1 | 10/2003 | Kishi et al. | |
| 6,750,844 B2 | 6/2004 | Nakanishi | |
| 6,751,007 B2 | 6/2004 | Liang et al. | |
| 2006/0087490 A1* | 4/2006 | Ding et al. | .................. 345/107 |

\* cited by examiner

*Primary Examiner*—David N Spector
(74) *Attorney, Agent, or Firm*—Rabin & Berdo, P.C.

(57) ABSTRACT

A transflective electrophoretic display and a method for manufacturing the same are proposed. The transflective electrophoretic display including a top substrate and a bottom substrate, multiple separating walls disposed between the top and bottom substrates, a transflective film, and an electrophoretic display medium, can be designed to display colors by using multicolor electrophoretic display media or color filters. The display can be viewed with or without ambient light by adopting a backlight module, as well as to improve the overall display quality.

48 Claims, 9 Drawing Sheets

TRANSFLECTIVE ELECTROPHORETIC DISPLAY AND MANUFACTURING METHOD THEREOF

BACKGROUND OF THE INVENTION

1. Field of the Invention

The present invention is related to a transflective electrophoretic display and a method for manufacturing the same, and more particularly, to a display structure that changes the behavior of charged pigment particles via adjustment of an electric field and a method for manufacturing the display structure.

2. Description of Related Art

An electrophoretic display adjusts an electric field to control the distribution of charged particles to change its display regions' reflectance for ambient light and thus to display images. The electrophoretic display is flexible and the images shown on the electrophoretic display can be viewed by using ambient light. Furthermore, the electrophoretic display can be made by using a roll-to-roll manufacturing procedure. It is thus convenient for mass production and its cost can also be reduced. Moreover, the visual angle of the electrophoretic display is unlimited. Hence, the images shown on the electrophoretic display can be viewed from any angle. In addition, the electrophoretic display is insensitive to spacing variation of substrates and possesses bistability. Hence, the technology of the electrophoretic display is vital for development of flexible displays or electronic papers.

In general, the surfaces of particles can be charged via the dissociation per se or absorption of other charged materials. When the charged particles are put in an electric field, they drift toward an oppositely charged pole. This phenomenon is called electrophoresis. The speed of electrophoresis alters with the categories, diameters, and concentration of charged particles, the intensity, distribution, and direction of external electric fields, and the categories of display solvents. The electrophoretic display shows the images by using the properties of electrophoresis.

U.S. Pat. No. 6,750,844 discloses an electrophoretic display structure. This patent discloses a transparent film made with microcapsules and coated with an adhesive material. The microcapsules include display solvent with white and black particles having opposite electric poles. The transparent film is disposed on a substrate with a driving circuit to provide a display device. U.S. Pat. No. 6,751,007 and 6,750,844 further disclose an electrophoretic display structure with separating walls. The separating walls are formed between display units to make the display structure stronger than the previous one. The shape, size, and proportion of the separating walls determine the implementation manner of the display structure. Hence, the separating walls are the main members of the display structure. The rooms formed between the separating walls are filled with an electrophoretic display solvent having pigment particles. Moreover, by using a microcup technology proposed in these two patents, the edge-sealing limitation of the display units is removed and the display structure has a better image-displaying quality. Besides, by using the microcup technology, the display solvent is effectively confined to specific rooms and the display structure can be made flexible.

Figure 1A:
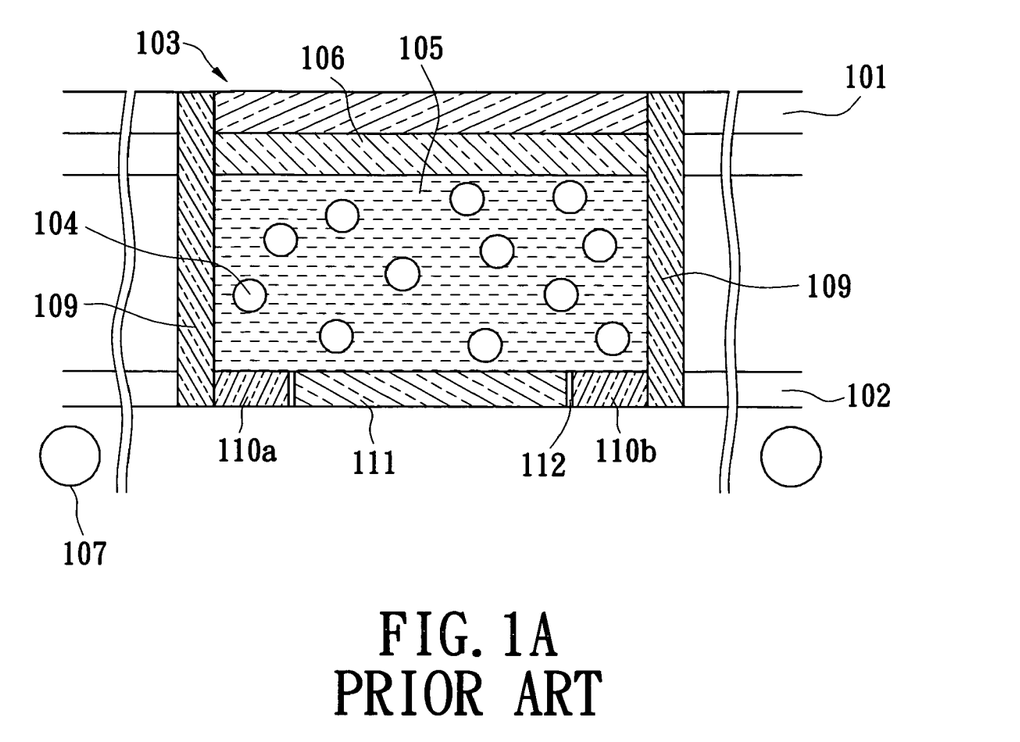
FIG. 1A is a schematic diagram showing a display cell of a conventional electrophoretic display device.

A transflective electrophoretic display is disclosed in U.S. Pat. No. 6,751,007. The display device has multiple display cells 103 separated by separating walls 109. FIG. 1A shows a display cell 103 of the transflective electrophoretic display. The display cell 103 has a top transparent layer 101 and a bottom electrode plate 102 and is surrounded by the separating walls 109. The room formed between the separating walls 109 is filled with a dielectric display solvent 105 having multiple charged pigment particles 104. A sealing layer 106 is provided on the dielectric display solvent 105 to confine it to the room formed between the separating walls 109. The display cell 103 is thereby completed. In addition, a backlight module 107 is provided to assist the electrophoretic display device to display images.

In the prior art shown in FIG. 1A, in order to perform the display function, the charged pigment particles 104 of the dielectric display solvent 105 are controlled by the electric field provided by the top and bottom substrates, i.e. the top transparent layer 101 and the bottom electrode plate 102. The electric field is provided in accordance with an up/down switching mode, an in-plane switching mode, and a dual switching mode. As shown in FIG. 1A, the top substrate is made of ITO glass. The bottom substrate includes in-plane electrodes 110a and 110b, bottom electrodes 111, and gaps 112.

The technology for providing in-plane electric fields can be found in U.S. Pat. No. 6,639,580, "Electrophoretic Display Device and Method for Addressing Display Device." The in-plane electric field is produced via the in-plane electrodes disposed on the substrate, i.e. the first and second display electrodes. The charged pigment particles of the electrophoretic display solvents are controlled by the electric fields to perform the display function.

Figure 1B:
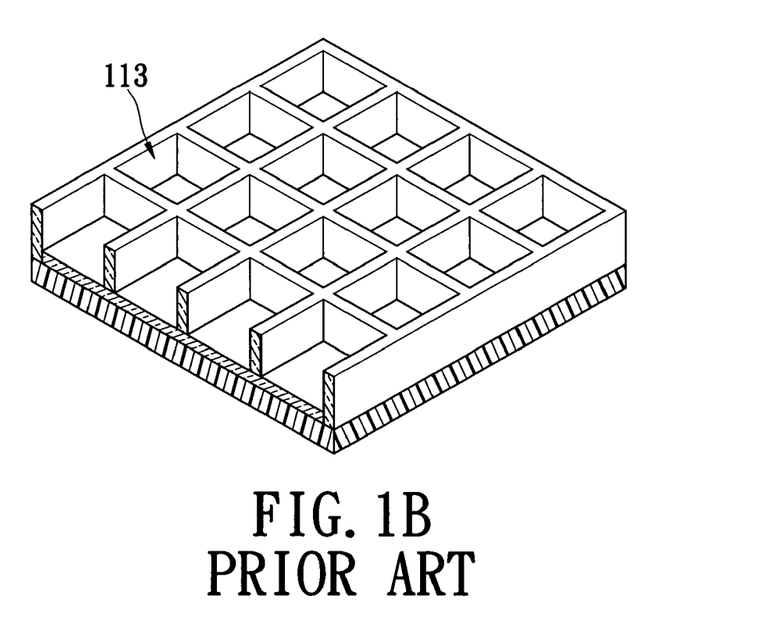
FIG. 1B is a schematic diagram showing a conventional electrophoretic display device.

Reference is made to FIG. 1B, which shows an embodiment of the prior art disclosed in U.S. Pat. No. 6,751,007. The display structure shown in FIG. 1B has multiple microcups, i.e. display cells 103, which form a rectangular array.

Figure 2A:
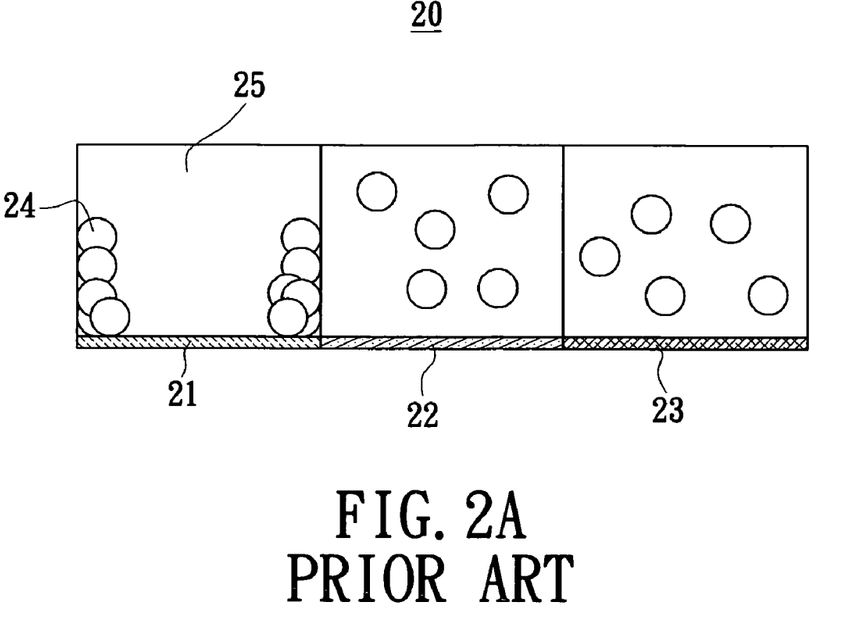
FIG. 2A is a schematic diagram showing a conventional color display cell.

U.S. Pat. No. 6,751,007 further discloses a color display structure. As shown in FIG. 2A, each color display cell 20 of the display structure at least has three display sub-cells for providing blue light, red light, and green light, respectively. The colorless display solvent 25 includes multiple white charged pigment particles 24 for scattering light emitted from a backlight module (not shown). The sub-cells have a red color filter 21, a green color filter 22, and blue color filter 23, respectively.

The electrodes of the bottom substrate are controlled to provide different electric fields to control the charged pigment particles 24 to change the light-scattering extents of the sub-cells. The filters 21, 22, and 23 are used to produce color lights via their light-filtering functions, respectively. Thus, various color effects are provided.

The white charged pigment particles 24 can be replaced by black charged pigment particles capable of absorbing light. In this way, another display structure with a contrary color-generating operation is provided.

Figure 2B:
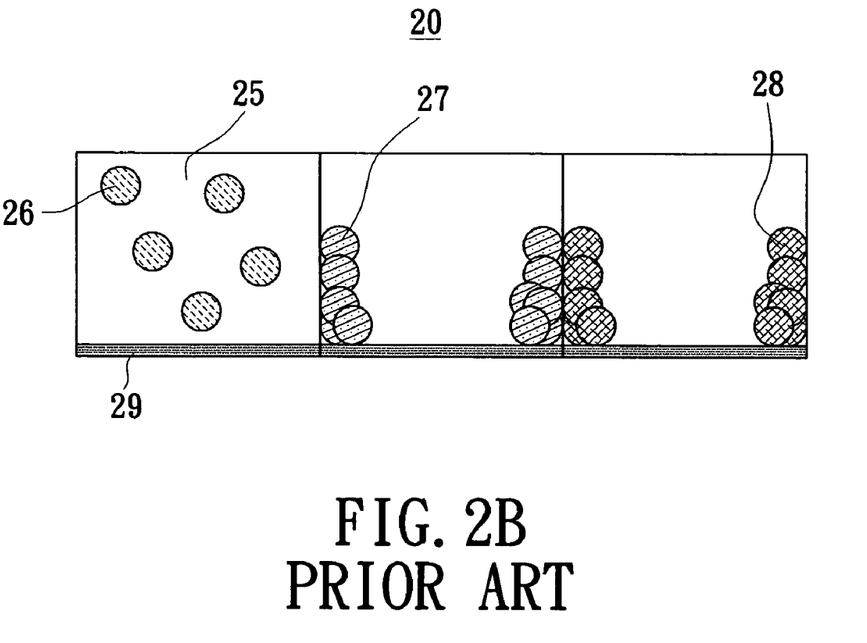
FIG. 2B is a schematic diagram showing another conventional color display cell.

Reference is made to FIG. 2B, which shows another color display structure of the prior art. The color display cell 20 includes three display sub-cells for providing blue light, red light, and green light, respectively. The colorless display solvent 25 includes multiple color charged pigment particles. The color charged pigment particles include red charged pigment particles 26, green charged pigment particles 27, and blue charged pigment particles 28. The color display cell 20 has a white or black back plate 29. The electrodes of the bottom substrate are controlled to provide different electric fields to control the color charged pigment particles 25, 27, and 28 to change the light-scattering extents of the sub-cells. Thus, various color effects are provided.

Most conventional electrophoretic display devices are reflective display devices. However, this type of display devices cannot show images when ambient light is insufficient or doesn't exist. On the other hand, transmittance electrophoretic display devices use the electrophoretic display media as light shutter, only. Color light needs to be produced by using color filters together with backlight modules. Thus, the power consumption of transmittance electrophoretic display devices is so large that made this display not suitable for mobile device applications.

The transflective electrophoretic display disclosed in U.S. Pat. No. 6,751,007 uses the separating walls 109 as a medium for light transmission. In this way, the electrophoretic display can be viewed even in darkness. However, the separating walls 109 may leak light. Furthermore, in this display device, the light emitted from the backlight module doesn't pass through the display solvent directly and is only used for illumination. Hence, this display device doesn't have a high display quality. At the same time, it adopts a dual-mode driving mechanism. Hence, this display device is complicated in design and has a difficult manufacturing process.

SUMMARY OF THE INVENTION

An objective of the present invention is to provide a transflective electrophoretic display structure to use both ambient light and backlight as light sources. The display structure of the present invention not only enhances the overall brightness but also illuminates the display area in darkness. The backlight module of the present invention can be adjusted according to the intensity of ambient light so that the power consumption is reduced and the contrast of images is increased. Moreover, since the present invention adopts a simple driving mechanism, the design and manufacturing process can be simplified.

For achieving the objective above, the present invention provides a method for manufacturing a transflective electrophoretic display having a transflective film. The method includes steps as follows. A top substrate having multiple first electrodes is provided. A bottom substrate having multiple second electrodes is provided. The transflective film is formed on the bottom substrate. Multiple separating walls are provided to form multiple display rooms between the top substrate and the bottom substrate. Finally, the top substrate and the bottom substrate are combined.

For achieving the objective above, the present invention provides a transflective electrophoretic display, including a top substrate having multiple first electrodes and multiple anisotropic reflective plates, a bottom substrate having multiple second electrodes, multiple separating walls that are made of an opaque material and form multiple display rooms between the top substrate and the bottom substrate, a display medium having multiple pigment particles and transparent display solvents, and a transflective film disposed on the bottom substrate. The display rooms are filled with the display medium.

Furthermore, in one embodiment, the transparent display solvents of the display medium can include red, blue, or green display solvents. In another embodiment, the color display solvents can be replaced by using red, green, and blue color filters together with colorless display solvents.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

The present invention provides a transflective electrophoretic display device, which has the advantages of reflective and transmittance display devices. The transflective electrophoretic display device has a transparent top substrate. The top and bottom substrates of the display device have electrodes for providing transverse electromagnetic fields. Between the top and bottom substrates form multiple separating walls. A transflective film and a transparent electrophoretic medium having pigment particles are provided on the bottom substrate. The display device can show a monochrome or color images.

Furthermore, ambient light and backlight both can completely pass through the display medium to enhance the brightness of the display device. Thus, the display device can be viewed without ambient light. Moreover, the intensity of the backlight can be adjusted according to the intensity of ambient light so that the consumption of electric energy is reduced. The embodiments of the present invention are described as follows.

Figure 3A:
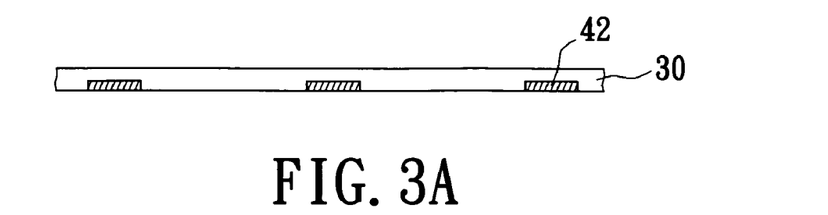
FIGS. 3A-3D show a manufacturing procedure of a transflective electrophoretic display device in accordance with the present invention.

Reference is made to FIGS. 3A-3D, which show a manufacturing procedure of a transflective electrophoretic display device in accordance with the present invention. In FIG. 3A, a top substrate 30 is provided. The top substrate 30 has multiple electrodes (not shown). Multiple color filters can be provided above or beneath the display rooms (not shown). The color filters can be disposed on the top or bottom substrate and their colors can be red, green, or blue. The color filters can also be replaced by an electrophoretic display medium. The top substrate 30 is transparent and has multiple anisotropic reflective plates 42. The anisotropic reflective plates 42 are located below display cells to reflect light along specific directions. The electrodes of the top and bottom substrates can be driven to form an electric field in accordance with an in-plane switching mode, an up/down switching mode or a dual switching mode.

Figure 3B:
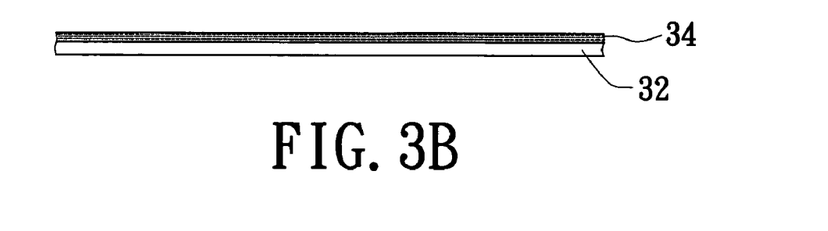

In FIG. 3B, a bottom substrate 32 is provided. The bottom substrate 32 has multiple electrodes and is transparent. The electrodes can be edge electrodes for producing transverse electromagnetic fields. A transflective film 34 is provided on the bottom substrate 32 and can be formed via a sputtering process. The transflective film 34 can be made of a metal material or a transmittance material with a specific structure. Both the transmittance and the reflectance of the transflective film 34 range from 1% to 99%. The transflective film 34 allows back light to pass partially through and partially reflects ambient light. In addition, a light source is disposed below the bottom substrate 32.

Figure 3C:
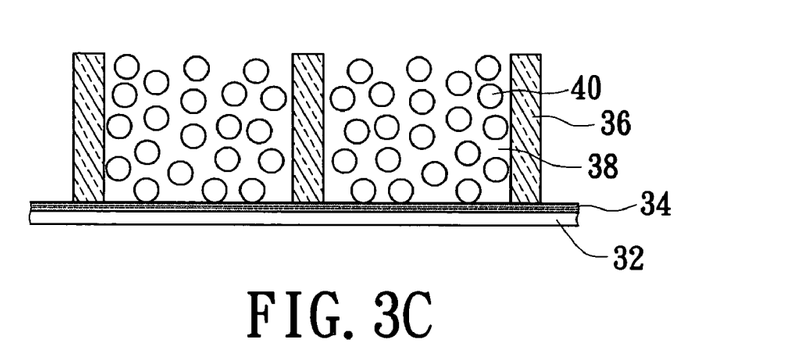

In Fig .3C, multiple separating walls 36 are formed between the top and bottom substrates to form multiple display rooms 38. The separating walls 36 can be transparent or opaque and form a close and regular structure with a lattice or hexagonal shape. An electrophoretic display medium is infused into the display rooms 38 and its color can be red, green or blue. The electrophoretic display medium can be replaced by multiple color filters. Multiple pigment particles 40 are placed into the display rooms 38. The pigment particles 40 can be black particles, color particles or transparent color particles.

Figure 3D:
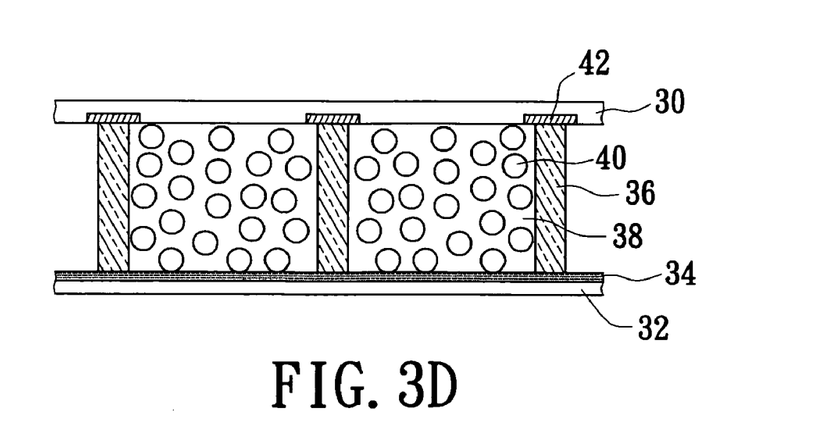

In FIG. 3D, the top substrate 30 and the bottom substrate 32 are combined. A light source can be disposed beneath the bottom substrate 32 (not shown). The light source can be a backlight module.

Figure 4A:
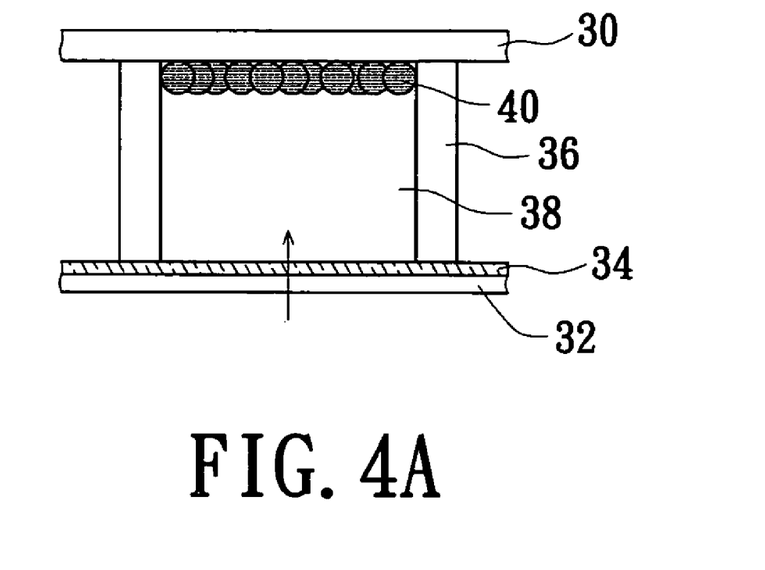
FIG. 4A shows a transflective electrophoretic display device having a display cell that displays a black color in accordance with the first embodiment of the present invention.

Reference is made to FIG. 4A, which shows a transflective electrophoretic display device having a display cell that displays a black color in accordance with the first embodiment of the present invention. In this embodiment, the color of the pigment particles is black. When light emitted from the backlight module passes through the bottom substrate 32 and the transflective film 34 to enter the display rooms 38, the light is reflected by the separating walls 36, which are opaque in this embodiment, and is passed toward the top substrate 30. As shown in FIG. 4A, since the light is completely absorbed by the black particles distributed along and covering the lower surface of the top substrate 30, the backlight does not pass through the display cell. In this embodiment, the black particles can also be distributed along and covering the upper surface of the bottom substrate 32 (not shown). In addition, since the black particles cover the top or bottom substrate, ambient light is also absorbed by the black particles. Hence, the display cell displays a black color.

Figure 4B:
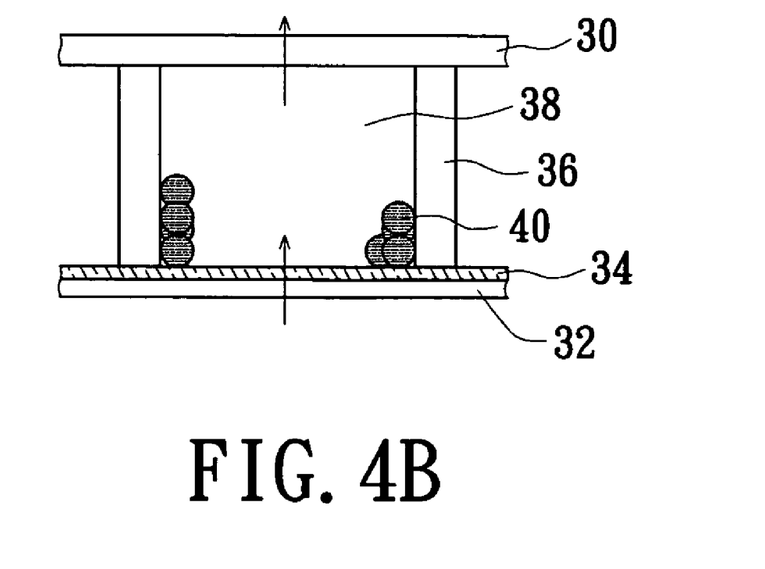
FIG. 4B shows a transflective electrophoretic display device having a display cell that displays a white color in accordance with the first embodiment of the present invention.

Reference is made to FIG. 4B, which shows a transflective electrophoretic display device having a display cell that displays a white color in accordance with the first embodiment of the present invention. In this embodiment, the separating walls 36 are opaque. When light emitted from the backlight module passes through the bottom substrate 32 and the transflective film 34 to enter the display rooms 38, the light is reflected by the separating walls 36 and is passed toward the top substrate 30. Since the black charged particles are attracted to the lower ends of the separating wall 36, the light can pass through the display cell completely to show a white color. In addition, the display device of the present invention can also show images via reflection of ambient light. The ambient light first passes through the top substrate 30 to enter the display room 38 and then is reflected out from the display cell by the transflective film 34. Thus, the display cell displays a white color.

Figure 5A:
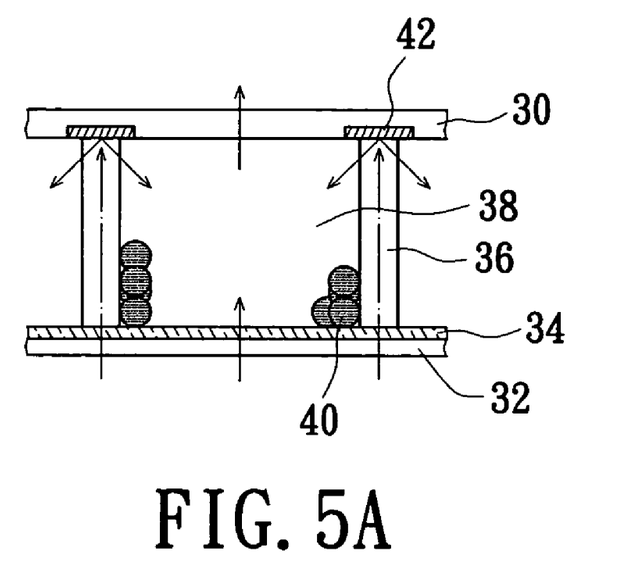
FIG. 5A shows a transflective electrophoretic display device having a display cell that displays a white color in accordance with the second embodiment of the present invention.

Reference is made to FIG. 5A, which shows a transflective electrophoretic display device having a display cell that displays a white color in accordance with the second embodiment of the present invention. The display cell includes a transparent top substrate 30 and a bottom substrate 32. Separating walls 36 are disposed between the top and bottom substrates. Anisotropic reflective plates 42 are disposed in the top substrate 30 above the separating walls 36. Both the transparent top substrate 30 and the bottom substrate 32 have in-plane electrodes for providing transverse electric fields. The pigment particles 40 are distributed near the lower ends of the separating walls 36. A transflective film 34 is provided on the bottom substrate 32.

In this embodiment, the separating walls 36 are transparent and light emitted from a light source disposed beneath the display room 38 can pass through the transflective film 34 and the separating walls 36. When the light reaches the anisotropic reflective plates 42, it is not reflected back along the original path but to the display room directly. The light is then reflected out from the display cell by the transflective film 34.

Figure 5B:
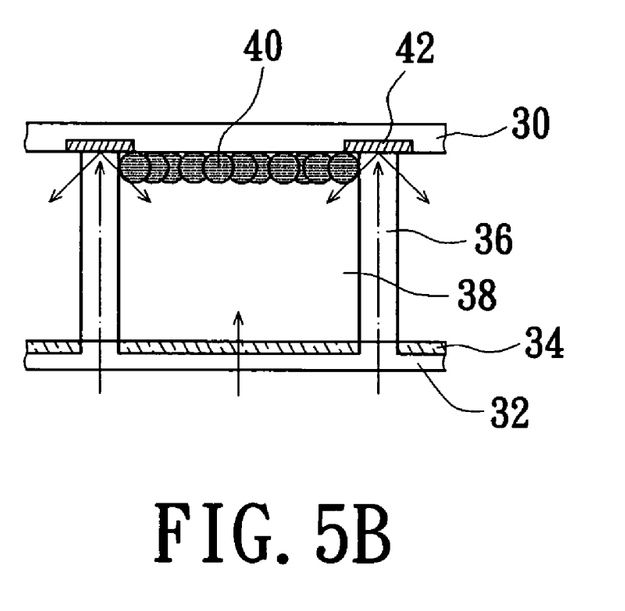
FIG. 5B shows a transflective electrophoretic display device having a display cell that displays a black color in accordance with the second embodiment of the present invention.

Reference is made to FIG. 5B, which shows a transflective electrophoretic display device having a display cell that displays a black color in accordance with the second embodiment of the present invention. As shown in FIG. 5B, light emitted from the light source disposed beneath the display room 38 passes through the transflective film 34 to enter the display room 38 and through the separating walls 36 to reach the anisotropic reflective plates 42. The light is not reflected back along the original path but to the display room directly. Due to the electric field provided by the electrodes of the bottom substrate 32, the pigment particles 40 are distributed along and cover the lower surface of the top substrate 30. Thus, the light inside the display room 38 is completely absorbed by the pigment particles 40 and the ambient light cannot enter the display room 38. Therefore, the display cell displays a black color in this status.

In the present invention, the electrodes of the bottom substrate are driven to form an electric field in accordance with an in-plane switching mode. The electrodes of the top substrate are driven to form an electric field in accordance with an up/down switching mode, an in-plane switching mode or a dual switching mode. A backlight module can be further included in the present invention and disposed beneath the bottom substrate.

Furthermore, by modification of the structure, the present invention can provide a display device with color display cells. Each of the color display cells at least has three sub-cells for showing a red color, a blue color and a green color, respectively. A color display cell includes a transparent top substrate and a bottom substrate. Separating walls are disposed between the top and bottom substrates. The top substrate or the bottom substrate has electrodes disposed thereon. The color display cell further includes multiple pigment particles and three transparent color electrophoretic display solvents having a red color, a blue color and a green color, respectively. The color electrophoretic display solvents can be replaced by using color filters together with colorless transparent electrophoretic display solvents.

The display device of the present invention is capable of using the light emitted from a backlight module or ambient light to display images. Hence, the display device is enhanced in brightness and can be viewed even without ambient light. The light intensity of the backlight module can be adjusted according to the intensity of ambient light to reduce the power consumption and improve on the contrast and color of the images shown.

Figure 6A:
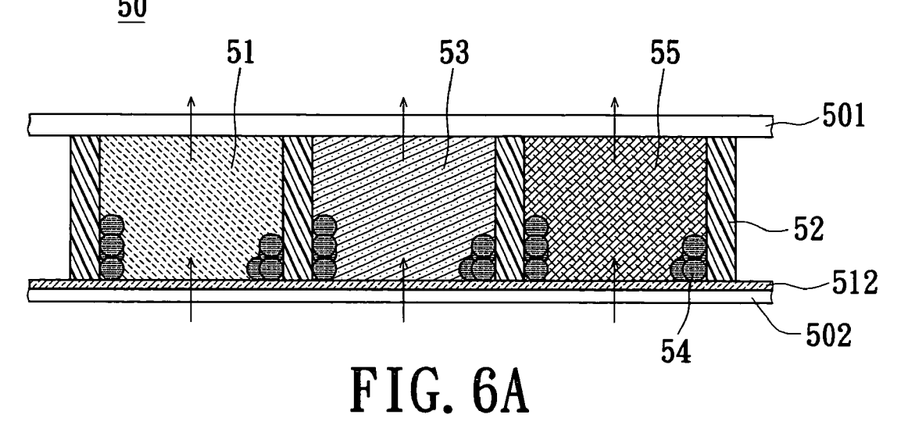
FIG. 6A shows a color transflective electrophoretic display device having a color display cell that displays a white color in accordance with the third embodiment of the present invention.
Figure 6B:
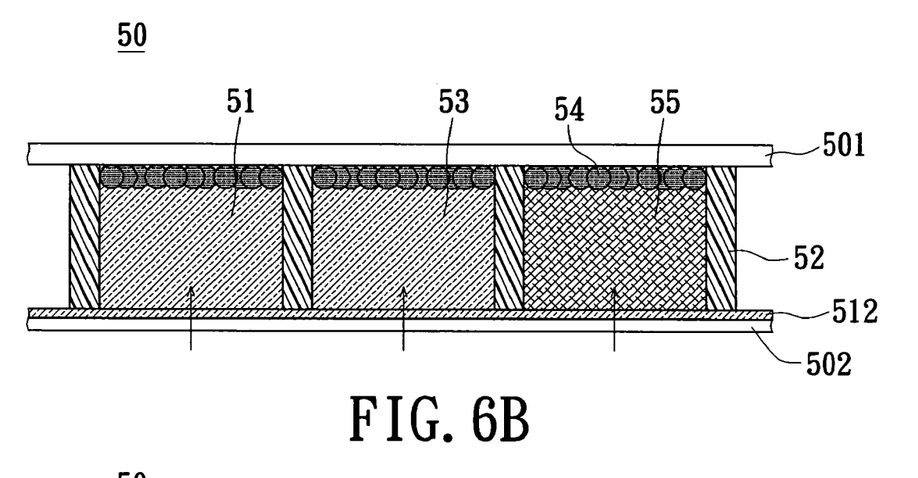
FIG. 6B shows a color transflective electrophoretic display device having a color display cell that displays a black color in accordance with the third embodiment of the present invention.
Figure 6C:
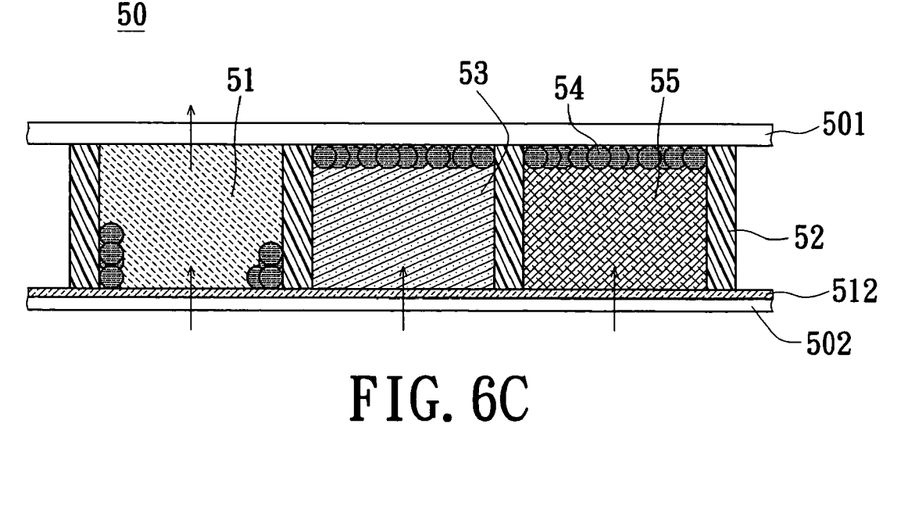
FIG. 6C shows a color transflective electrophoretic display device having a color display cell that displays a red color in accordance with the third embodiment of the present invention.

Reference is made to FIGS. 6A-C, which shows a color transflective electrophoretic display device in accordance with the present invention. As shown in FIGS. 6A-C, a color display cell 50 includes a transparent top substrate 501 and a bottom substrate 502. Separating walls 52 are disposed between the top and bottom substrates to form display rooms. The bottom substrate 502 has electrodes disposed thereon. The color display cell 50 at least has three sub-cells for showing a red color, a blue color and a green color, respectively. Furthermore, the top substrate 501 can have electrodes capable of being driven to produce an electric field in accordance with an in-plane switching mode, an up/down switching mode or a dual switching mode. The bottom substrate 502 has a transflective film.

In this embodiment, the separating walls 52 are opaque. When light passes through the top substrate 501 and color display solvents filling the display rooms, color light is produced. In addition, the color light can also be produced by reflection of ambient light. When ambient light passes through the color display solvents 51, 53, and 55 and then reflected back by the transflective film of the bottom substrate 502, the color light is produced. In this way, the brightness is enhanced.

The colors of the color display solvents 51, 53, and 55 are red, green, and blue, respectively. Each of the color display solvents 51, 53, and 55 includes multiple charged pigment particles 54. When light is reflected from the anisotropic plates of the top substrate 501 into the color display solvents 51, 53, and 55, light with different colors is produced.

Reference is made to FIG. 6A, which shows a color transflective electrophoretic display device having a color display cell that displays a white color in accordance with the third embodiment of the present invention. First, light emitted from the backlight module beneath the bottom substrate 502 passes through the transflective film 512 and enters the display rooms formed between the separating walls 52. Due to the color display solvents 51, 53, and 55, red, green and blue lights are produced. In addition, the charged pigment particles in the color display solvents 51, 53, and 55 drift to the lower ends of the separating walls 52 because a predetermined electric field is provided. Thus, the red, green and blue lights can pass through the top substrate 501 and are mixed together to form white light.

The color display cell can also produce color light by reflection of ambient light. When ambient light passes through the color display solvent 51, 53, or 55 and is reflected back by the transflective film 512, the color light is produced. In this way, the overall brightness of the display device is enhanced.

Reference is made to FIG. 6B, which shows a color transflective electrophoretic display device having a color display cell that displays a black color in accordance with the third embodiment of the present invention. The color display cell 50 at least has three sub-cells for showing a red color, a blue color and a green color, respectively. First, light emitted from the backlight module beneath the bottom substrate 502 passes through the transflective film 512 and enters the display rooms formed between the separating walls 52. In order to display a black color, the electric field is controlled to make the black charged particles drift toward and completely cover the lower surface of the top substrate 501. The light provided by the backlight module thus cannot pass through the top substrate 501, so the color display cell 50 shows a black color.

If the color display cell 50 needs to show a red color, as shown in FIG. 6C, the electric field is controlled to make the black charged particles inside the green display solvent 53 and the blue display solvent 55 cover the lower surface of the top substrate 501 and make the black charged particles inside the red display solvent 51 drift to the lower ends of the separating walls 52. The light can pass thus through the transflective film 512 and the red display solvent 51 to make the color display cell 50 show a red color. Similarly, by changing the position of the black charged particles, the color display cell 50 can show various colors.

The color display cell mentioned above is formed by using the separating walls 52 disposed between the top and bottom substrates. The position of the black charged particles is changed according to the electric field. For example, if the display cell needs to display a white color, all of the black charged particles are attracted to low ends of the separating walls. Thus, light can completely pass through the three sub-cells of the color display cell to produce red, green, and blue lights. Then, the red, green, and blue lights are mixed together to show a white color.

Figure 7A:
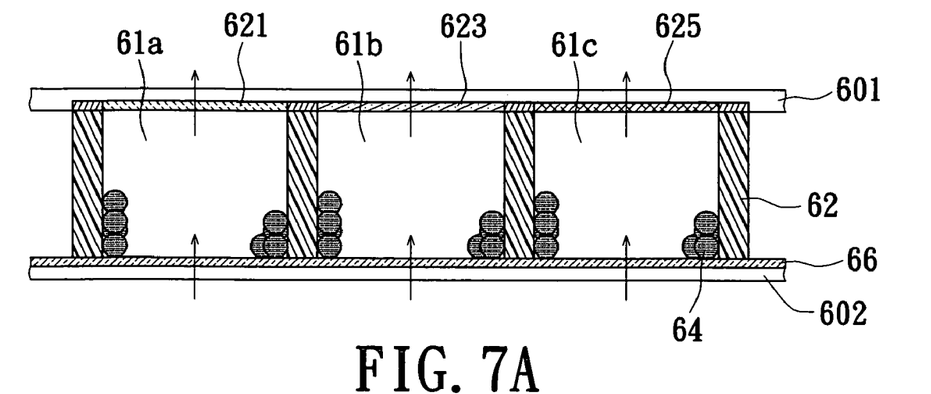
FIG. 7A shows a color transflective electrophoretic display device having a color display cell that displays a white color in accordance with the fourth embodiment of the present invention.

Reference is made to FIG. 7A, which shows a color transflective electrophoretic display device having a color display cell displaying a white color in accordance with the fourth embodiment of the present invention. In this embodiment, the separating walls are opaque. The top substrate 601, the bottom substrate 602, and the separating walls 62 form multiple display rooms. The display rooms are filled with transparent, colorless, electrophoretic display solvents 61a, 61b, and 61c. Each of the transparent, colorless, electrophoretic display solvents 61a, 61b, and 61c contains multiple black charged particles 64.

In this embodiment, a color display cell has three display rooms. Each of the display rooms has a color filter disposed therein. The color filter is attached to the lower surface of the top substrate 601. The colors of the color filters 621, 623, and 625 of the three display rooms are red, green, and blue.

First, a predetermined electric field is provided to make the charged pigment particles 64 drift to the lower ends of the separating walls 62. At the same time, light emitted from the backlight module beneath the bottom substrate 602 passes through the electrophoretic display solvents 61a, 61b, and 61c and the color filters 621, 623, and 625 to produce red, green and blue lights. The red, green and blue lights are then mixed together to form white light.

The color display cell can also produce color light by reflection of ambient light. When ambient light passes through the color filters 621, 623, and 625 and is reflected back by the transflective film 66, color light is produced. In this way, the color display cell doesn't need to use the backlight module or uses the backlight module just for enhancing overall brightness of the display device.

Figure 7B:
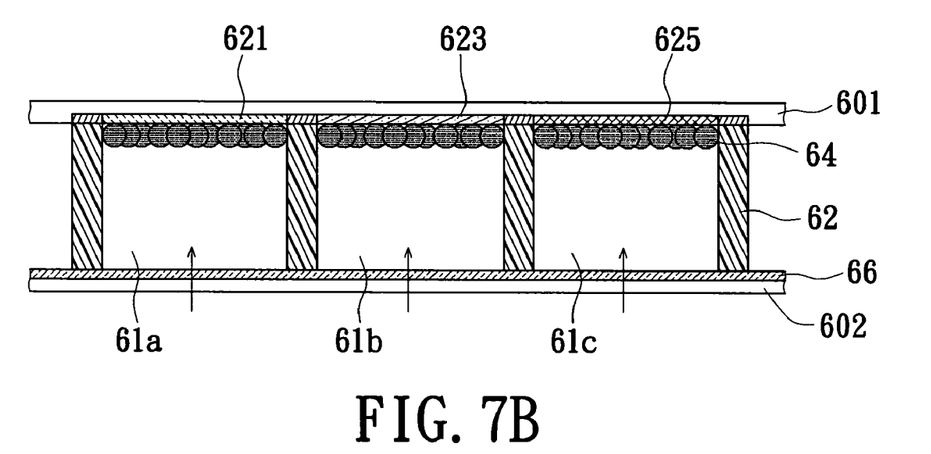
FIG. 7B shows a color transflective electrophoretic display device having a color display cell that displays a black color in accordance with the fourth embodiment of the present invention.

Reference is made to FIG. 7B, which shows a color transflective electrophoretic display device having a color display cell that displays a black color in accordance with the fourth embodiment of the present invention. First, light emitted from the backlight module beneath the bottom substrate 602 passes through the transflective film 66 and enters the display rooms formed between the separating walls 62. In order to display a black color, the electric field is controlled to make the black charged particles 64 drift toward and completely cover the lower surface of the top substrate 601. The light provided by the backlight module thus cannot pass through the top substrate 601, so the color display cell 50 shows a black color.

Figure 7C:
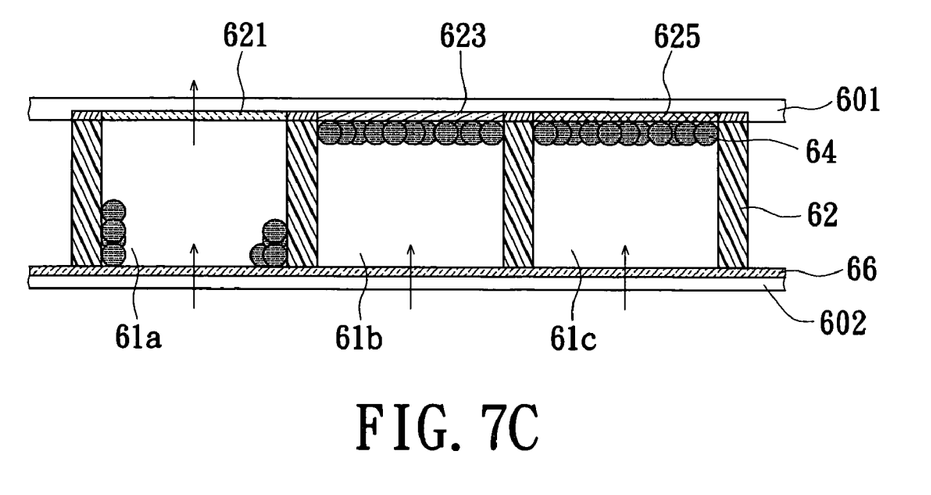
FIG. 7C shows a color transflective electrophoretic display device having a color display cell that displays a red color in accordance with the fourth embodiment of the present invention.

If the color display cell needs to show a red color, as shown in FIG. 7C, the electric field is controlled to make the black charged particles inside the display rooms having the green color filter 623 and the blue color filter 625 cover the lower surface of the top substrate 601 and make the black charged particles inside the display room having the red color filter 621 drift to the lower ends of the separating walls 62. Hence, the light can only pass through the transflective film 66 and the red color filter 621 to make the color display cell show a red color.

Figure 8A:
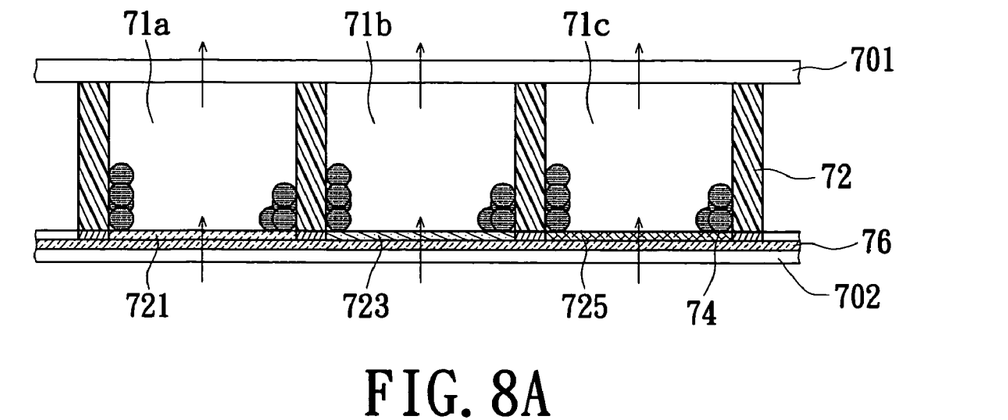
FIG. 8A shows a color transflective electrophoretic display device having a color display cell that displays a white color in accordance with the fifth embodiment of the present invention.

Reference is made to FIG. 8A, which shows a color transflective electrophoretic display device having a color display cell that displays a white color in accordance with the fifth embodiment of the present invention. In this embodiment, the separating walls are opaque. The top substrate 701, the bottom substrate 702, and the separating walls 72 form multiple display rooms. The display rooms are filled with transparent, colorless, electrophoretic display solvents 71a, 71b, and 71c. Each of the transparent, colorless, electrophoretic display solvents 71a, 71b, and 71c contains multiple black charged pigment particles 74.

In this embodiment, a color display cell has three display rooms. Each of the display rooms has a color filter disposed therein. The color filter is attached to the upper surface of the bottom substrate 702. The colors of the color filters 721, 723, and 725 of the three display rooms are red, green, and blue.

First, a predetermined electric field is provided to make the black charged pigment particles 74 drift to the lower ends of the separating walls 72. At the same time, light emitted from the backlight module beneath the bottom substrate 702 passes through the electrophoretic display solvents 71a, 71b, and 71c and the color filters 721, 723, and 725 to produce red, green and blue lights. The red, green and blue lights are then mixed together to form white light.

The color display cell can also produce color light by reflection of ambient light. When ambient light passes through the color filters 721, 723, and 725 and is reflected back by the transflective film 76, the color light is produced. In this way, the color display cell doesn't need to use the backlight module or uses the backlight module just for enhancing overall brightness of the display device.

Figure 8B:
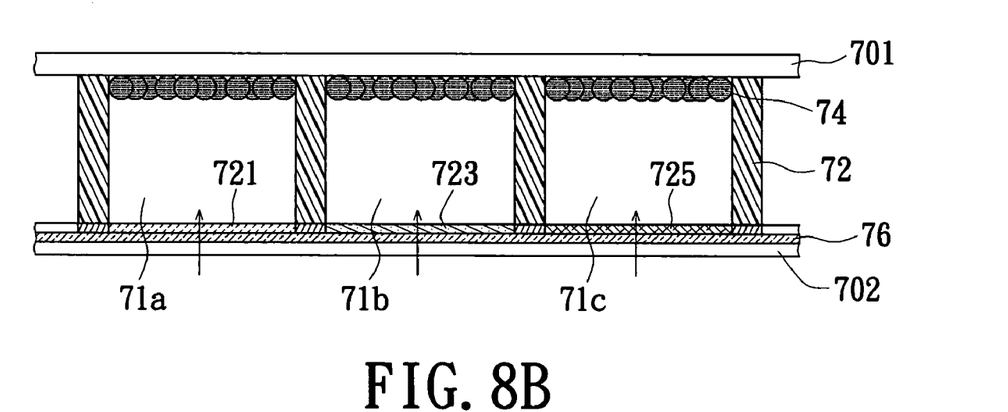
FIG. 8B shows a color transflective electrophoretic display device having a color display cell that displays a black color in accordance with the fifth embodiment of the present invention.

Reference is made to FIG. 8B, which shows a color transflective electrophoretic display device having a color display cell that displays a black color in accordance with the fifth embodiment of the present invention. First, light emitted from the backlight module beneath the bottom substrate 702 passes through the transflective film 76 and the color filters and enters the display rooms formed between the separating walls 72. In order to display a black color, the electric field is controlled to make the black charged pigment particles 74 drift toward and completely cover the lower surface of the top substrate 701. The light provided by the backlight module thus cannot pass through the top substrate 701, so the color display cell shows a black color.

Figure 8C:
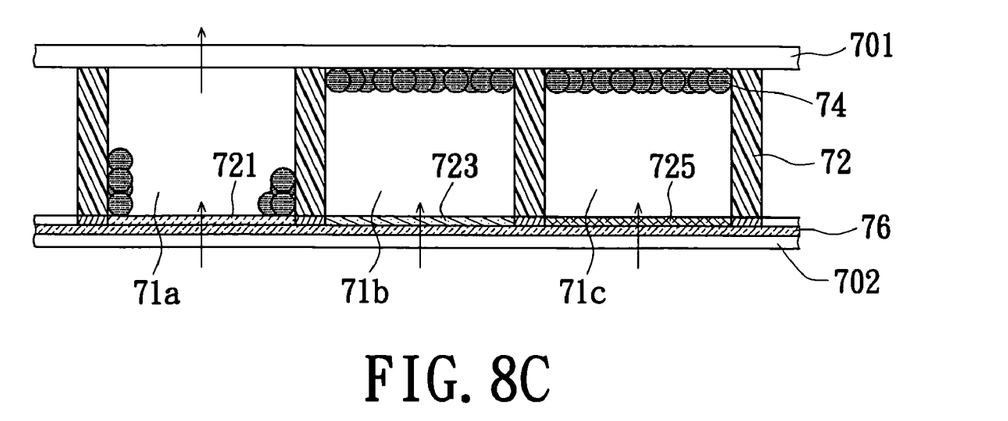
FIG. 8C shows a color transflective electrophoretic display device having a color display cell that displays a red color in accordance with the fifth embodiment of the present invention.

If the color display cell needs to show a red color, as shown in FIG. 8C, the electric field is controlled to make the black charged pigment particles 74 inside the display rooms having the green color filter 723 and the blue color filter 725 cover the lower surface of the top substrate 701 and make the black charged pigment particles 74 inside the display room having the red color filter 721 drift to the lower ends of the separating walls 72. Hence, the light can only pass through the transflective film 76 and the red color filter 721 to make the color display cell show a red color.

Figure 9A:
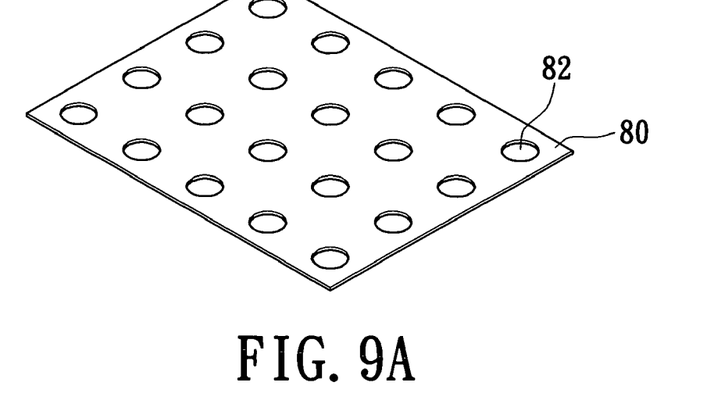
FIG. 9A shows a specific structure of a transflective film in accordance with the present invention.

Reference is made to FIG. 9A, which shows a specific structure of a transflective film in accordance with the present invention. The transflective film 80 allows light emitted from the backlight module to pass partially through and partially reflects ambient light. The transflective film 80 can be made of metal. Both the transmittance and the reflectance of the transflective film 34 range from 1% to 99%. In this embodiment, the transflective film 80 is a reflective film having multiple round holes 82 formed thereon. The round holes 82 are provided for light to pass through. Due to the round holes, light emitted from the backlight module is allowed to pass partially through the transflective film 80 while ambient light is partially reflected.

Figure 9B:
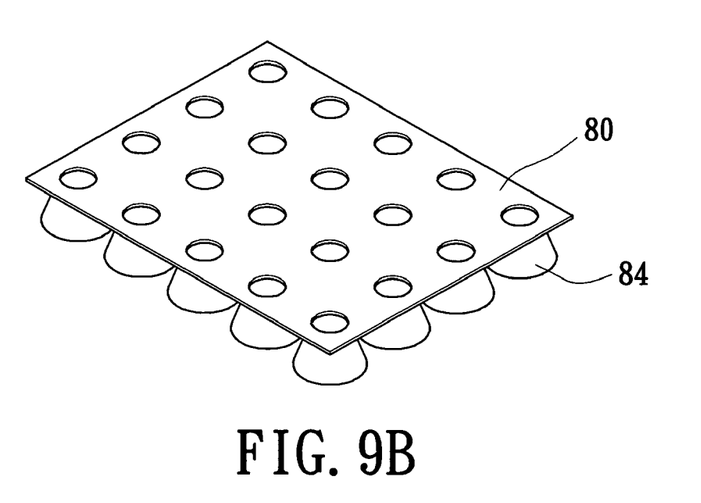
FIG. 9B shows another specific structure of a transflective film in accordance with the present invention.

Reference is made to FIG. 9B, which shows another specific structure of a transflective film in accordance with the present invention. In this embodiment, the transflective film 80 is made with cup-shaped openings 84. When the cup-shaped openings 84 are made, multiple reflective layers 840 are first provided on the cup-shaped openings 84 and then multiple metal films 842 are coated above the reflective layers 840. The reflective layers 840 are made of resin.

Figure 9C:
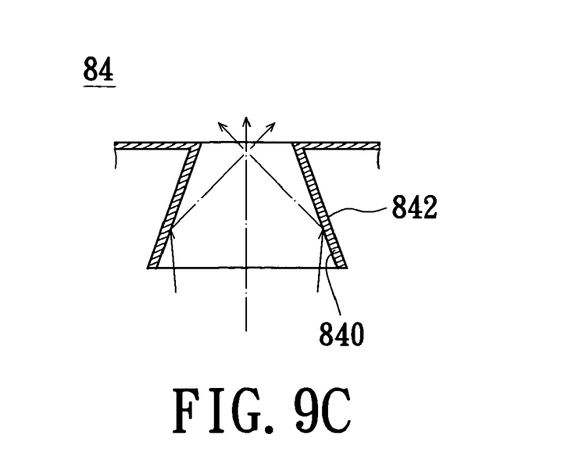
FIG. 9C shows transmitting paths of the light emitted from the backlight module when a transflective film having cup-shaped openings is used.

In the design mentioned above, changing the inclined angle of the sidewall of the cup-shaped opening 84 can effectively improve upon the transmittance of the light emitted from the backlight module. As shown in FIG. 9C, which shows transmitting paths of the light emitted from the backlight module, the cup-shaped design of the present invention allows more light to pass through the transflective film 80.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are embraced within the scope of the invention as defined in the appended claims.

What is claimed is:

1. A transflective electrophoretic display, comprising:
   a top substrate having multiple first electrodes;
   a bottom substrate having multiple second electrodes;
   a plurality of separating walls forming multiple display rooms between the top substrate and the bottom substrate;
   a display medium having multiple pigment particles and transparent display solvents; and
   a transflective film disposed on the bottom substrate;
   wherein the display rooms are filled with the display medium.

2. The transflective electrophoretic display according to claim 1, further comprising a backlight module disposed below the bottom substrate.

3. The transflective electrophoretic display according to claim 1, wherein the top substrate has multiple anisotropic reflective plates disposed thereon.

4. The transflective electrophoretic display according to claim 1, wherein the anisotropic reflective plates are disposed right above the separating walls.

5. The transflective electrophoretic display according to claim 1, wherein the first electrodes of the top substrate are used together with the second electrodes of the bottom substrate to provide an electric field in accordance with an in-plane switching mode, an up/down switching mode, or a dual switching mode.

6. The transflective electrophoretic display according to claim 1, wherein the separating walls are transparent or opaque.

7. The transflective electrophoretic display according to claim 1, wherein the separating walls form a close and regular structure.

8. The transflective electrophoretic display according to claim 7, wherein the close and regular structure has a lattice shape or a hexagonal shape.

9. The transflective electrophoretic display according to claim 1, wherein the pigment particles are black particles, color particles or transparent color particles.

10. The transflective electrophoretic display according to claim 1, wherein the transflective film allows back light to pass partially through and partially reflects ambient light.

11. The transflective electrophoretic display according to claim 1, wherein the transflective film has a transmittance ranging from about 1% to 99%.

12. The transflective electrophoretic display according to claim 1, wherein the transflective film is made of metal.

13. The transflective electrophoretic display according to claim 12, wherein the transflective film is formed via a sputtering process.

14. The transflective electrophoretic display according to claim 1, wherein the transflective film has multiple round holes or multiple cup-shaped openings formed therein.

15. The transflective electrophoretic display according to claim 14, wherein the multiple cup-shaped openings have multiple reflective layers and multiple metal films coated above the reflective layers.

16. The transflective electrophoretic display according to claim 15, wherein the reflective layers are made of resin.

17. A transflective electrophoretic display, comprising:
   a top substrate having multiple first electrodes;
   a bottom substrate having multiple second electrodes;
   a plurality of separating walls forming multiple display rooms between the top substrate and the bottom substrate;
   a red display medium having multiple first pigment particles and first transparent display solvents;
   a green display medium having multiple second pigment particles and second transparent display solvents;
   a blue display medium having multiple third pigment particles and third transparent display solvents; and
   a transflective film disposed on the bottom substrate;
   wherein the display rooms are filled with a specific display medium selected from the red display medium, the green display medium, and the blue display medium.

18. The transflective electrophoretic display according to claim 17, further comprising a backlight module disposed below the bottom substrate.

19. The transflective electrophoretic display according to claim 17, wherein the top substrate has multiple anisotropic reflective plates disposed thereon.

20. The transflective electrophoretic display according to claim 19, wherein the anisotropic reflective plates are disposed right above the separating walls.

21. The transflective electrophoretic display according to claim 17, wherein the first electrodes of the top substrate are used together with the second electrodes of the bottom substrate to provide an electric field in accordance with an in-plane switching mode, an up/down switching mode, or a dual switching mode.

22. The transflective electrophoretic display according to claim 17, wherein the separating walls are transparent or opaque.

23. The transflective electrophoretic display according to claim 17, wherein the separating walls form a close and regular structure.

24. The transflective electrophoretic display according to claim 23, wherein the close and regular structure has a lattice shape or a hexagonal shape.

25. The transflective electrophoretic display according to claim 17, wherein the pigment particles are black particles, color particles or transparent color particles.

26. The transflective electrophoretic display according to claim 17, wherein the transflective film allows back light to pass partially through, and partially reflects ambient light.

27. The transflective electrophoretic display according to claim 17, wherein the transflective film has a transmittance ranging from about 1% to 99%.

28. The transflective electrophoretic display according to claim 17, wherein the transflective film is made of metal.

29. The transflective electrophoretic display according to claim 28, wherein the transflective film is formed via a sputtering process.

30. The transflective electrophoretic display according to claim 17, wherein the transflective film has multiple round holes or multiple cup-shaped openings formed thereon.

31. The transflective electrophoretic display according to claim 30, wherein the multiple cup-shaped openings have multiple reflective layers and have multiple metal films coated above the reflective layers.

32. The transflective electrophoretic display according to claim 31, wherein the reflective layers are made of resin.

33. A transflective electrophoretic display, comprising:
   a top substrate having multiple first electrodes;
   a bottom substrate having multiple second electrodes;
   a plurality of separating walls that form multiple display rooms between the top substrate and the bottom substrate;

a display medium having multiple pigment particles and transparent display solvents;

a red color filter, wherein the red color filter is transparent and disposed on the top substrate or the bottom substrate;

a green color filter, wherein the green color filter is transparent and disposed on the top substrate or the bottom substrate;

a blue color filter, wherein the blue color filter is transparent and disposed on the top substrate or the bottom substrate; and a transflective film disposed on the bottom substrate;

wherein the display rooms are filled with the display medium.

34. The transflective electrophoretic display according to claim 33, further comprising a backlight module disposed below the bottom substrate.

35. The transflective electrophoretic display according to claim 33, wherein the top substrate has multiple anisotropic reflective plates disposed thereon.

36. The transflective electrophoretic display according to claim 35, wherein the anisotropic reflective plates are disposed right above the separating walls.

37. The transflective electrophoretic display according to claim 33, wherein the first electrodes of the top substrate are used together with the second electrodes of the bottom substrate to provide an electric field in accordance with an in-plane switching mode, an up/down switching mode, or a dual switching mode.

38. The transflective electrophoretic display according to claim 33, wherein the separating walls are transparent or opaque.

39. The transflective electrophoretic display according to claim 33, wherein the separating walls form a close and regular structure.

40. The transflective electrophoretic display according to claim 39, wherein the close and regular structure has a lattice shape or a hexagonal shape.

41. The transflective electrophoretic display according to claim 33, wherein the pigment particles are black particles, color particles or transparent color particles.

42. The transflective electrophoretic display according to claim 33, wherein the transflective film allows back light to pass partially through, and partially reflects ambient light.

43. The transflective electrophoretic display according to claim 33, wherein the transflective film has a transmittance ranging from about 1% to 99%.

44. The transflective electrophoretic display according to claim 33, wherein the transflective film is made of metal.

45. The transflective electrophoretic display according to claim 44, wherein the transflective film is formed via a sputtering process.

46. The transflective electrophoretic display according to claim 33, wherein the transflective film has multiple round holes or multiple cup-shaped openings formed thereon.

47. The transflective electrophoretic display according to claim 46, wherein the multiple cup-shaped openings have multiple reflective layers and have multiple metal films coated above the reflective layers.

48. The transflective electrophoretic display according to claim 47, wherein the reflective layers are made of resin.

* * * * *